United States Patent
Baier et al.

(10) Patent No.: US 12,190,262 B2
(45) Date of Patent: Jan. 7, 2025

(54) METHOD AND DEVICE FOR THE COMPUTER-AIDED OPTIMIZATION OF TOOL TRANSPORTING OPERATIONS FOR AT LEAST ONE TOOL MAGAZINE HAVING A NUMBER OF MAGAZINE LOCATIONS

(71) Applicant: Siemens Aktiengesellschaft, Munich (DE)

(72) Inventors: Georg Baier, Munich (DE); Silvio Becher, Munich (DE); Lena Hupp, Munich (DE); Christian Royer, Ottobrunn (DE)

(73) Assignee: Siemens Aktiengesellschaft, Munich (DE)

( * ) Notice: Subject to any disclaimer, the term of this patent is extended or adjusted under 35 U.S.C. 154(b) by 956 days.

(21) Appl. No.: 17/276,645

(22) PCT Filed: Sep. 17, 2018

(86) PCT No.: PCT/EP2018/074999
§ 371 (c)(1),
(2) Date: Mar. 16, 2021

(87) PCT Pub. No.: WO2020/057713
PCT Pub. Date: Mar. 26, 2020

(65) Prior Publication Data
US 2021/0268617 A1    Sep. 2, 2021

(51) Int. Cl.
*G06Q 10/047*    (2023.01)
*G06Q 10/0631*    (2023.01)

(52) U.S. Cl.
CPC ....... *G06Q 10/047* (2013.01); *G06Q 10/0631* (2013.01)

(58) Field of Classification Search
None
See application file for complete search history.

(56) References Cited

U.S. PATENT DOCUMENTS 5,155,679 A    10/1992    Jain et al.
5,189,624 A *   2/1993    Barlow .............. G05B 19/4065
                                                  700/169
(Continued)

FOREIGN PATENT DOCUMENTS

CN    102422313 A    4/2012
CN    103987487 A    8/2014
(Continued)

OTHER PUBLICATIONS

De Souza R B R et al: "A tool cluster based strategy for the management of cutting tools in flexible manufacturing systems"; Journal of Operations Management; vol. 10; No. 1; pp. 73-91; XP055283607; ISSN: 0272-6963, DOI:10.1016/0272-6963(91)90036-W.

(Continued)

*Primary Examiner* — Cory W Eskridge
(74) *Attorney, Agent, or Firm* — Schmeiser, Olsen & Watts, LLP

(57) ABSTRACT

A method for the computer-aided optimization of tool transports for at least one tool magazine having a number of magazine locations, which is used for a machine tool for the production of one or more workpieces with the aid of the tools provided by a magazine device at a provision location, the method including: a) detecting a quantity of tools, b) determining the space required for each tool, c) detecting a quantity of occupiable magazine locations for each tool, d) detecting a permissible output magazine occupancy e) detecting the permissible target magazine occupancy, f) detecting a quantity of transport durations required for a journey of the magazine device, g) determining a partial quantity of tool transports for which a transport sequence is specifiable so that the tools are movable in the transport (Continued)

sequence, h) optimizing the transport sequence for the partial quantity of tool transports.

20 Claims, 7 Drawing Sheets

(56) References Cited

U.S. PATENT DOCUMENTS

| | | | | |
|---|---|---|---|---|
| 5,822,207 | A * | 10/1998 | Hazama | B25J 9/1666 700/165 |
| 6,074,329 | A * | 6/2000 | Hirano | G05B 19/41815 29/33 P |
| 9,904,281 | B2 * | 2/2018 | Nicholson | G05B 19/18 |
| 10,099,330 | B2 | 10/2018 | Kraft et al. | |
| 2001/0041649 | A1 | 11/2001 | Susnjara | |
| 2010/0287073 | A1 | 11/2010 | Kocis et al. | |
| 2014/0342889 | A1 | 11/2014 | Kraft et al. | |
| 2015/0038307 | A1 | 2/2015 | Kitamura et al. | |
| 2015/0248128 | A1 | 9/2015 | Davis et al. | |
| 2017/0010194 | A1 * | 1/2017 | Showalter | G01N 35/0099 |
| 2018/0299871 | A1 * | 10/2018 | Pfaffinger | G05B 19/4187 |

FOREIGN PATENT DOCUMENTS

| | | |
|---|---|---|
| CN | 104063746 A | 9/2014 |
| CN | 104797378 A | 7/2015 |
| CN | 107272574 A | 10/2017 |
| CN | 107438803 A | 12/2017 |
| DE | 2609337 A1 | 9/1977 |
| DE | 102011088055 A1 | 6/2013 |
| DE | 102012111230 A1 | 5/2014 |
| DE | 202014007115 U1 | 9/2014 |

OTHER PUBLICATIONS

Anonymous: "Travelling salesman problem—Wikipedia", XP055545287, Gefunden im Internet: URL:https://en.wikipedia.org/w/index.php?title=Travelling salesman problem&oldid=856886923, [gefunden am Jan. 21, 2019], pp. 2-3; 2018.

Oerlemans Alwin: "Production Planning for Flexible Anufacturing Systems", XP055545320, Gefunden im Internet:URL:https://www.merit.unu.edu/training/theses/oerlemans alwin.pdf [gefunden am Jan. 21, 2019], pp. 125-154; 1992.

PCT International Search Report and Written Opinion of International Searching Authority mailed Jan. 30, 2019 corresponding to PCT International Application No. PCT/EP2018/074999 filed Sep. 17, 2018.

Logistics Optimization Technology and Methods; Jul. 31, 2013; products, Beijing China Wealth Out Society.

\* cited by examiner

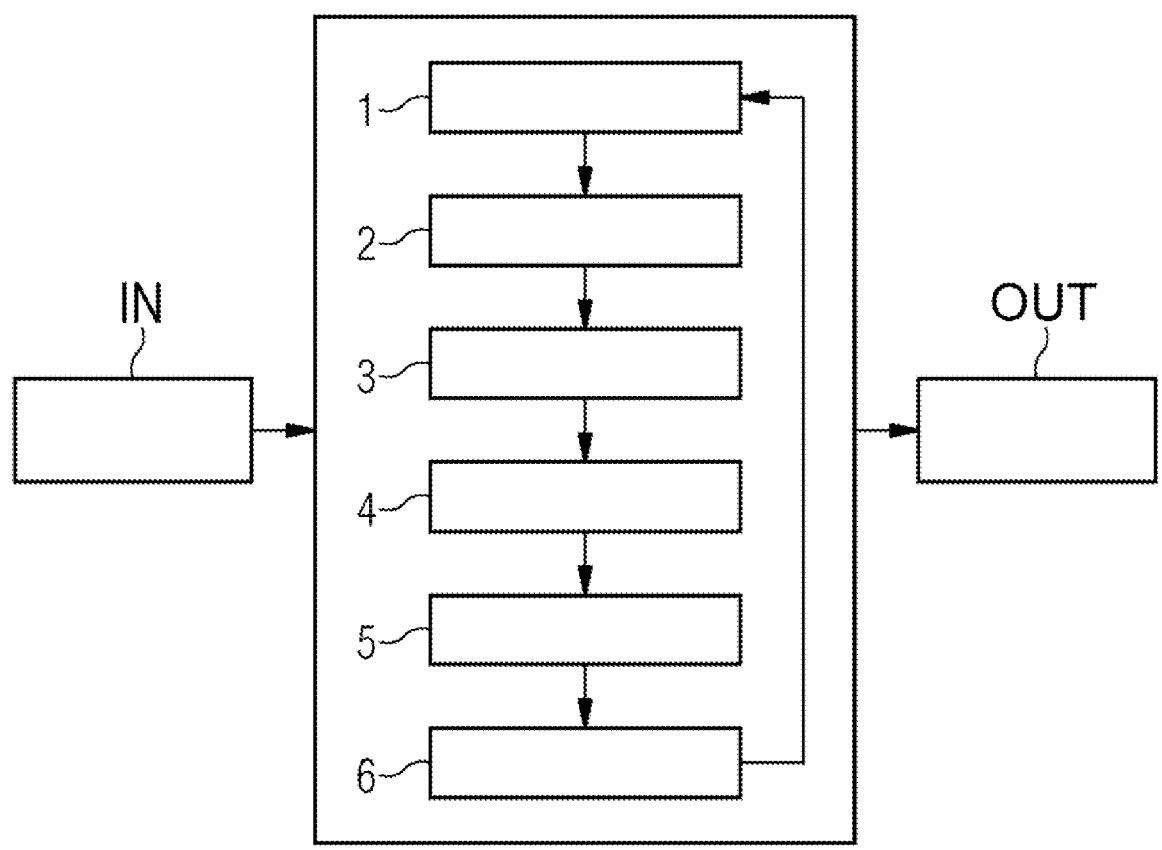

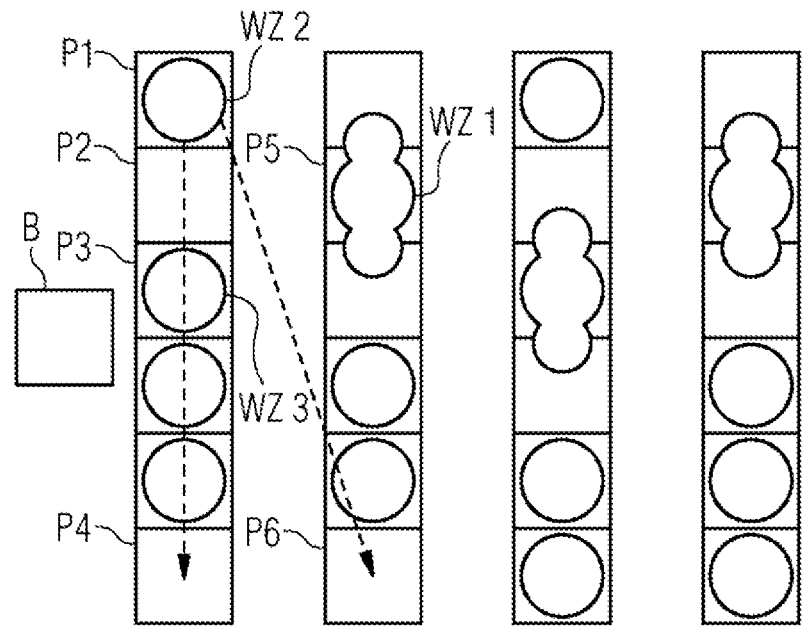
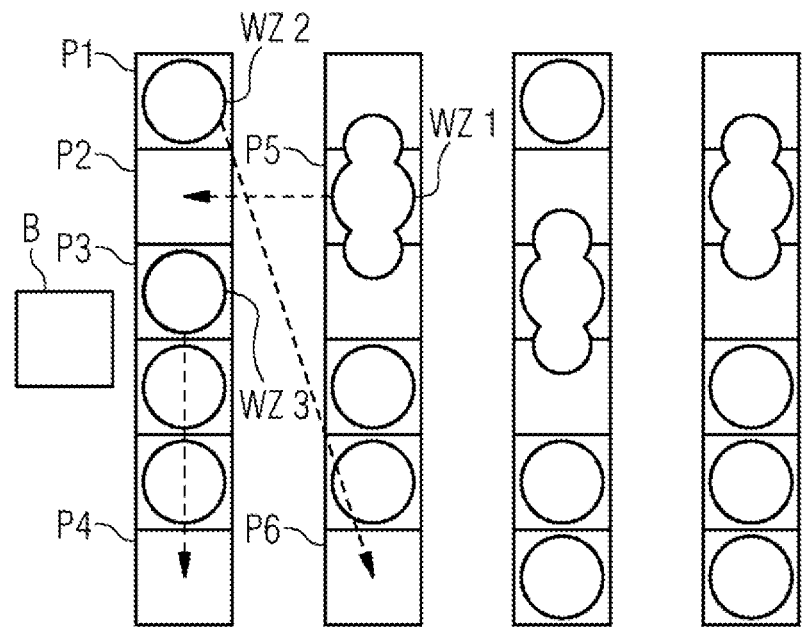

METHOD AND DEVICE FOR THE COMPUTER-AIDED OPTIMIZATION OF TOOL TRANSPORTING OPERATIONS FOR AT LEAST ONE TOOL MAGAZINE HAVING A NUMBER OF MAGAZINE LOCATIONS

CROSS-REFERENCE TO RELATED APPLICATIONS

This application claims priority to PCT Application No. PCT/EP2018/074999, having a filing date of Sep. 17, 2018, the entire contents of which are hereby incorporated by reference.

FIELD OF TECHNOLOGY

The following relates to a method and to a device for the computer-aided optimization of tool transporting operations for at least one tool magazine which has a number of magazine locations and can be used for a machine tool which is used to produce one or more workpieces using the tools provided by a magazine device at a provision location.

BACKGROUND

A machine tool is an automated production device with which a specified shape is generated on a workpiece by means of one or more tools. A plurality of tools can be assigned to a type of tool, e.g. milling. Another type of tool can be e.g. drilling. A machine tool has a tool spindle in which the processing tool, also referred to as a spindle tool, is located during the processing.

The tools which can be used by the machine tool to process a workpiece are stored in a tool magazine. There are various types of this. Very frequently used form are chain magazines which are used, e.g. in the automobile industry.

A further type of magazine are rack magazines R such as are indicated for example in FIG. 1 in which a very large number of different tools can be accommodated (up to 500 tools or even possibly more). The tools are stored at fixed magazine locations P therein. Such a magazine can be composed of a main side and an opposing side lying opposite.

The rack magazine has a device, in particular a magazine device, which is not illustrated in FIG. 1 and with which a tool can be stored at its magazine location P and retrieved. This type of magazine is used in particular when a relatively large variety of different workpieces from which a multiplicity of different tools is required is to be produced with a machine tool.

The processing of a workpiece of a specific type of workpiece is carried out with a specified or predefined sequence of tools. One tool can often occur repeatedly in this sequence in this context. The sequence is the same for all the workpieces of a type of workpiece, e.g. car seat. The sequence can be different for workpieces in another type of workpiece.

During a working step of processing a workpiece with a tool in the sequence, the spindle tool, the "preceding tool" of the preceding work step is moved back to its magazine location in the rack magazine. Then, an empty movement occurs to the magazine location of the "following tool" of the following work step. This tool is then picked up and transported or transferred to a provision location. When the current work step, i.e. the processing with the current spindle tool, is ended, the tool is exchanged in the spindle (e.g. with a tool changer). If the processing with the spindle tool is ended, but the following tool is not yet ready for the following work step, a waiting time occurs for the supply of a spindle. These individual waiting times reduce the machine efficiency and increase the production length. Therefore, these waiting times are to be avoided.

Space restrictions may be taken into account with respect to the positioning and transfer of tools in a rack magazine. For example, the following exemplary space restrictions may be taken into account:

A tool must not be usually positioned at any magazine location, i.e. there are magazine locations which can be occupied by the tool under the following conditions:

the type of magazine location of the tool and the type of magazine location of the magazine or rack locations must be compatible. Therefore, e.g. heavy tools must not be positioned at magazine locations for lightweight tools, and under certain circumstances vice versa.

tools must not protrude beyond the edge.

there must be no tools located at barred magazine locations.

A permissible magazine occupancy is an arrangement of the tools in the magazine, so that every tool is located at a location which can be occupied, and the space requirements of the tools do not overlap. Permissible magazine locations depend on the current occupancy of the magazine tool. Accordingly, all the permissible machine locations may be subject to additional limitations, for example:

at most one tool must be positioned at each magazine location; and the space required for the tool must not overlap with the space required for another tool which is generally adjacent in the magazine.

If a plurality of tools are produced in succession, it may be advantageous to reposition or re-sort, without a collision, the tools in the tool magazine in order, for example, to reduce waiting times during the supply of spindles and therefore to increase the machine efficiency. A permissible target assignment or target allocation for the tools which also takes into account the space restrictions may be provided. In this context, without a collision with respect to the space requirement means that the tool can be transported to a permissible magazine location.

SUMMARY

An aspect relates to optimize tool transporting operations. The original tool assignment is to be transferred into the target assignment, so that at every point in time in the re-sorting process the permissibility of the magazine occupancy is complied with and the required time period for the tool transporting operations or for the re-sorting process is minimized.

Embodiments of the invention describe a method for the computer-aided optimization for transporting operations for at least one tool magazine which has a number of magazine locations and which can be used for a machine tool which is used to produce one or more workpieces using the tools provided by a magazine device at a provision location, having the following steps:

a) detecting a quantity of tools,
b) detecting the space required for each tool,
c) detecting a quantity of magazine locations which can be occupied for each tool,
d) detecting the permissible initial magazine occupancy, wherein an initial magazine location is detected for each tool, e) detecting the permissible target magazine occupancy, wherein target magazine locations are detected for at least one subset of the detected quantity of tools for which a tool transporting operation is to be carried out, f) detecting a quantity of transportation time periods which are respectively required by a movement of the magazine device from one magazine location to another magazine location, g) determining a subset of tool transporting operations for which a transportation sequence can be specified or is specified, so that in this transportation sequence the tools can be moved to their target magazine location without a collision in respect of the space required by their occupied magazine location, and h) optimizing the transportation sequence for this subset of tool transporting operations in such a way that the sum of the transportation time periods required for these tool transporting operations is minimized.

The re-sorting process or the re-positioning of a given transportation sequence of tools in the magazine generally occurs as follows: the magazine device moves to the initial location of the first tool in the transportation sequence. This tool is then transported without a collision (with respect to its required space) to its target magazine location. Then, the magazine device moves without a tool to the initial location of the second tool in the transportation sequence and transports this again without a collision to its target magazine location. This is repeated until the given transportation sequence has been worked through.

Such a subset of tool transporting operations can be determined, for example, as follows: search for all the tool transporting operations which can be executed without a collision and select any sequence. If the quantity contains an element, then such a tool transporting operation is found.

The magazine location which is occupied in step g) can be the currently occupied magazine location, the initial magazine location, but also a magazine location at which the tool is intermediately parked.

Steps g) and h) can, where appropriate, be carried out repeatedly until all the tools detected in step e) have reached their target magazine location.

If any tool occupies its target magazine location, the quantity of magazine locations which can be occupied by it is reduced to the target magazine location. Such a tool must then no longer be shifted.

The tool transporting operations can be carried out on the basis of the optimized transportation sequence.

By means of the procedure according to embodiments of the invention the sum of the transportation time periods required for these tool transporting operations is minimized. The quantity of transportation time periods can comprise a quantity of empty movement time periods for each tool-less movement of the magazine device from one magazine location to another magazine location. Specified optimization can therefore be carried out in such a way that the sum of the empty movement time periods is minimized.

Instances of jamming typically constitute a conflict in respect of access to resources, in this case to the magazine locations. In particular, transportation cycles can occur which for example have such an effect that a first tool is to be transported to the location of a second tool, and vice versa, and therefore jamming, also referred to as deadlock occurs.

At least one tool from the detected quantity of tools may be transported without a collision from its occupied magazine location to another magazine location which can be occupied, in order to determine a subset of tool transporting operations with at least one element according to step g), and in order to continue with step h). The steps g) and h) can, if appropriate, be carried out repeatedly, as long as at least one subset with one element (i.e. the elements are the tool transporting operations) can be determined in step g).

In other words, in step g), an empty subset is determined, and the method is terminated in this way. However, there can then still be transportation cycles which are not broken up.

Such instances of jamming are detected or determined by the method according to embodiments of the invention by, if appropriate, using a depth-first search in a polynomial running time and "removed" or excluded from the optimization which is to be carried out. In addition, the tools which, for a tool transporting operation, have a sequential dependence, also referred to as successor precedence, can be excluded from the optimization with respect to the determined instances of jamming. The sequential dependencies with respect to the determined instances of jamming can also be determined by a width-first or depth-first search in a polynomial running time.

In order to break up this jamming, a first tool, which is located at the target magazine location of a second tool, may first be intermediately parked at another magazine location, in order to be able to transport the second tool to its target magazine location.

Accordingly, the specified or predefined subset of tool transporting operations can be determined from step g) by:

a) forming precedencies for the tool transporting operations, b) determining tool transporting operations which are involved in jamming during the occupation of the magazine locations for the tool transporting operations, c) determining tool transporting operations which have a sequential dependence on the determined instances of jamming, d) determining the subset of tool transporting operations with the exclusion of the tool transporting operations determined in b) and c).

In other words, such instances of jamming can be broken up by the following heuristic approach:

searching for a magazine location which can be occupied by a tool involved in jamming, and which location can first be reached directly and reached indirectly only when there is a failure, execution of the correspondingly required tool transporting operations.

In order to proceed "directly" in one development of embodiments of the invention, at least one tool from the detected quantity of tools, which one tool is involved in jamming or in a sequential dependence, may be transported without a collision from the magazine location which is occupied by it to another magazine location which can be occupied, in order to determine a subset of tool transporting operations with at least one element according to step g), and in order to continue with step h).

Therefore, another tool which is involved in the same instance of jamming can be transported without a collision from its occupied magazine location to the target magazine location which has become free.

In order to proceed "indirectly" in one development of embodiments of the invention, at least one tool from the detected quantity of tools is transported without a collision from the magazine location which is occupied by it to another magazine location which can be occupied, so that at least one tool which is involved in jamming or in a sequential dependence can be transported without a collision from its magazine location to this magazine location which can be occupied and which has become free, in order to determine at least a subset of tool transporting operations with a single element according to step g) and in order to continue with step h).

The "shifted" tool normally firstly remains there on its current occupied magazine location. If the tool has a target magazine location, it is transported later to said location.

As a result, this optimized tool transportation sequence is added to a list of one or more optimizations which have already been performed above with respect to the tool transportation sequence. Tool transporting operations are therefore optimized if the tool transporting operations can also be carried out on the basis of the optimized transportation sequence.

The overall re-sorting time period which results from the transportation time periods, possibly including empty movement time periods, can result from the retrieval time periods which comprise in each case the time period for the retrieval of the tool by the magazine device for a magazine location which is permissible for the tool to a magazine location which is permissible for the tool, and from the necessary empty movement time periods, wherein an empty movement means movement of the magazine device without a tool from a first magazine location to another second magazine location.

The specified optimization can be carried out by means of the nearest neighbor heuristic. In the nearest neighbor heuristic, at the start a tool transporting operation is carried out which can be carried out without collision. Then, from among the possible transporting operations without a collision that is selected which is minimal for the empty movement time period from the target magazine location of the tool transported last to the magazine location of the selected tool. This is carried out until all tool transporting operations are carried out.

Alternatively, the specified optimization can be carried out by means of mixed integral linear optimization which is respectively explained in more detail in the exemplary embodiments below.

A specific case of optimization methods is linear optimization. It is concerned with the optimization of linear target functions over a quantity which is limited by linear equations and inequations. It is a basis of the solution methods of the "mixed" integral linear optimization. What is referred to as a solver is a generic term for specific mathematical computer programs which can solve mathematical problems numerically. In conjunction with MILP (mixed integer linear programming or mixed integral linear programming) standard solves such as e.g. CPLEX, Scip, Gurobi, Xpress can be used for IP programs (integral optimization models). A starting configuration which is brought iteratively to a target result by means of optimization is typically specified. For a starting configuration of the MTLP model it is possible to use a calculation from a nearest neighbor heuristic.

According to embodiments of the invention, a model for the mixed integral linear optimization can be formulated as what is referred to as an asymmetrical traveling salesman problem taking into account the precedence, which problem can be represented by a graph with nodes and edges. In this context, the nodes are each represented by a tuple composed of an initial magazine location and a target magazine location from the detected subset of tool transporting operations whose initial magazine location and target magazine location are different. The edges can each be supplemented by a weighting which results in each case from an empty movement time period from a target magazine location of the preceding node to an initial magazine location of the following node.

Embodiments of the invention provide the following advantages:

Automated re-sorting of rack magazines for machine tools.

Very short re-sorting time by minimizing the empty movement times.

Re-sorting of rack magazines for minimizing the waiting times during the supply of spindles.

Reducing the down time of the machine tools since the machine does not have to be completely loaded and unloaded.

A further aspect of embodiments of the invention provides a control device which is embodied according to the type described above and the embodiments thereof in particular for carrying out the method. The control device or control apparatus (not shown in FIG. 1) can be a computer which is also arranged in the machine tool and possibly arranged in a remote fashion or a control module which is integrated into the machine tool.

In an embodiment, the control device for the computer-aided optimization of a tool transporting sequence for at least one tool magazine (R) which has a number of magazine locations (P) and which can be used for a machine tool which is used to produce one or more workpieces using the tools provided by a magazine device at a provision location, having:

a) a detection unit for detecting a quantity of tools,
b) the same or another detection unit for detecting the space required for each tool,
c) the same or another detection unit for detecting a quantity of machine locations which can be occupied for each tool,
d) the same or another detection unit for detecting a permissible initial magazine occupancy, wherein an initial magazine location is detected for each tool,
e) the same or another detection unit for detecting the permissible target magazine occupancy, wherein target magazine locations are detected for at least one subset of the detected quantity of tools for which a tool transporting operation is to be carried out,
f) the same or another detection unit for detecting a quantity of transportation time periods which respectively require a movement of the magazine device from one magazine location to another magazine location,
g) a determining unit for determining a subset of tool transporting operations for which a transportation sequence can be specified or is specified so that the tools in this transportation sequence can be moved without a collision with respect to the space requirement from their occupied magazine location to their target magazine location, and
h) an optimization unit for optimizing the transportation sequence for this subset of tool transporting operations in such a way that the sum of the transportation time periods which are required for these tool transporting operations is at a minimum or is minimized.

The units can be implemented by means of hardware, firmware and/or software.

A further aspect of embodiments of the invention is a computer program product (non-transitory computer readable storage medium having instructions, which when executed by a processor, perform actions) with program code means for carrying out the method when it runs on a control device of the type specified above or is stored in a computer-readable medium.

The computer program product can be stored in a computer-readable medium. The computer program or product can be produced in a customary programming language, (e.g. C++, Java). The processing device can comprise a commercially available computer or server with corresponding input means, output means and storage means. This processing device can be integrated in the control device or in its means.

The control device and the computer program product can be developed or embodied in a way analogous to the method specified above.

BRIEF DESCRIPTION

Some of the embodiments will be described in detail, with reference to the following figures, wherein like designations denote like members, wherein:

FIG. 2 shows a schematic flow diagram of the iterative method with a starting configuration, in which the integral linear optimization method is applied;

FIG. 8A shows a transporting operation to a directly reachable and to an indirectly reachable permissible magazine location; and FIG. 8B shows a further step in the transporting operation to a directly reachable and to an indirectly reachable permissible magazine location shown in FIG. 8A.

DETAILED DESCRIPTION

According to FIG. 2, the input IN is, as already described, the initial assignment and the target assignment which is to be reached for the tools at the magazine locations P in the magazine R. In this embodiment, both the initial assignment and the target assignment satisfy all the space restrictions. In this context, the following are detected: a quantity of tools, the space requirement for each tool, a quantity of permissible magazine locations which can be occupied by each tool, the (permissible) initial magazine occupancy and therefore the initial magazine location for each tool, the permissible target magazine occupancy and therefore the target magazine locations for at least one subset of the detected quantity of tools for which a tool transporting operation is to be carried out, as well as a quantity of transportation time periods which is respectively required for a movement of the magazine device from one magazine location to another magazine location.

An aspect relates to an optimized transportation sequence for tools, wherein each tool is to be transported without collision with respect to its required space from its original magazine location to its target magazine location. However, as a result of the defined initial assignment and target assignment or target magazine occupancy the following two cases can occur:

1. Some tools must firstly be transported away from their original magazine location to a magazine location which can be occupied and which is free or has become free, before another tool can be positioned at said location.
2. There are transportation cycles.

Figure 1:
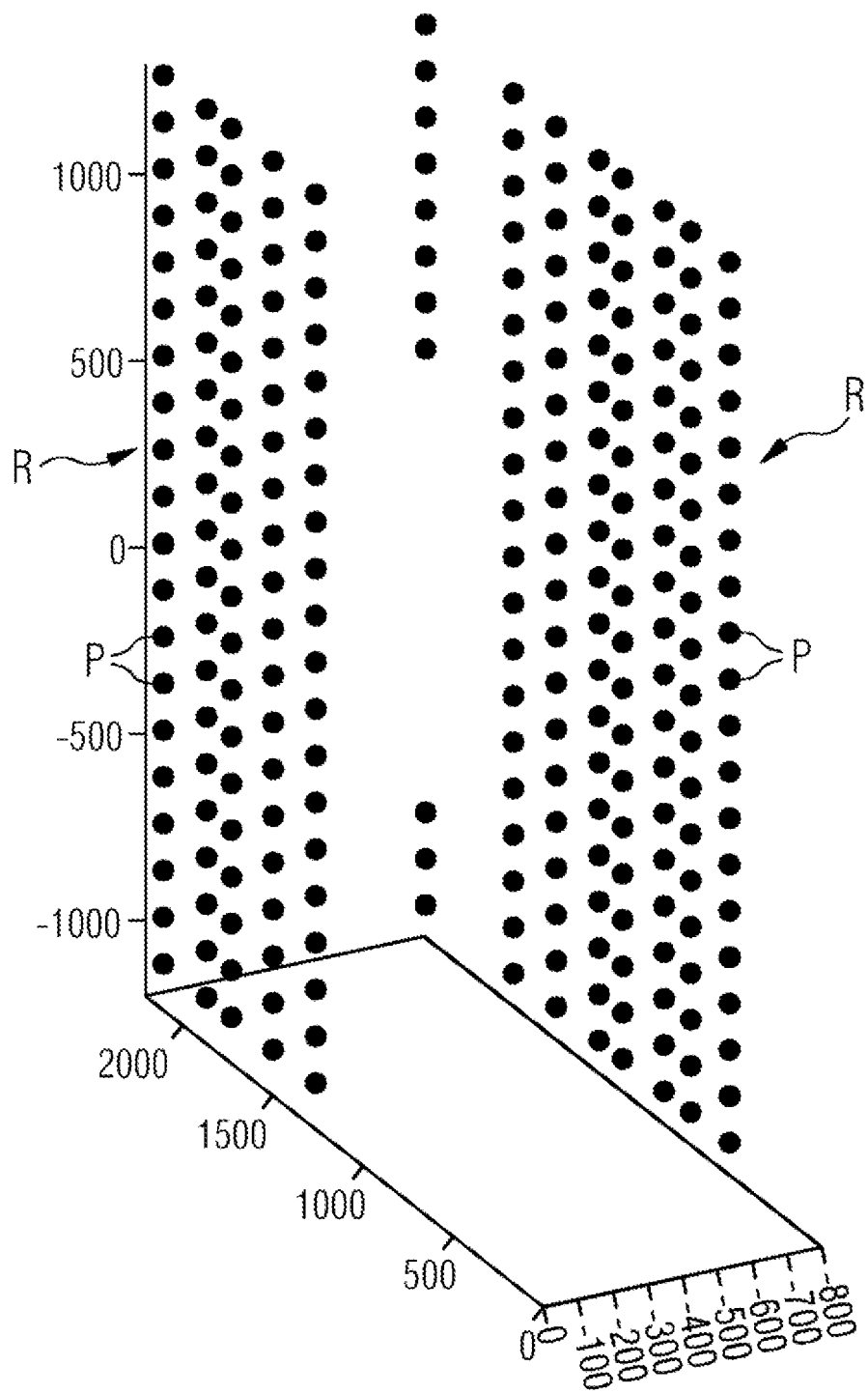
FIG. 1 shows the locations mentioned at the beginning in a rack magazine, wherein the main side is arranged on the right and the opposing side on the left.
Figure 3A:
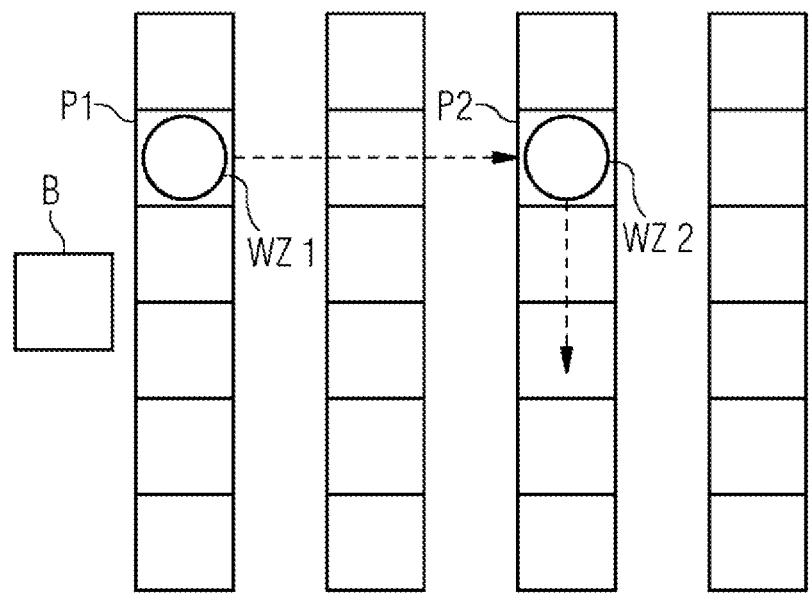
FIG. 3A shows a procedure for the definition of precedence.
Figure 3B:
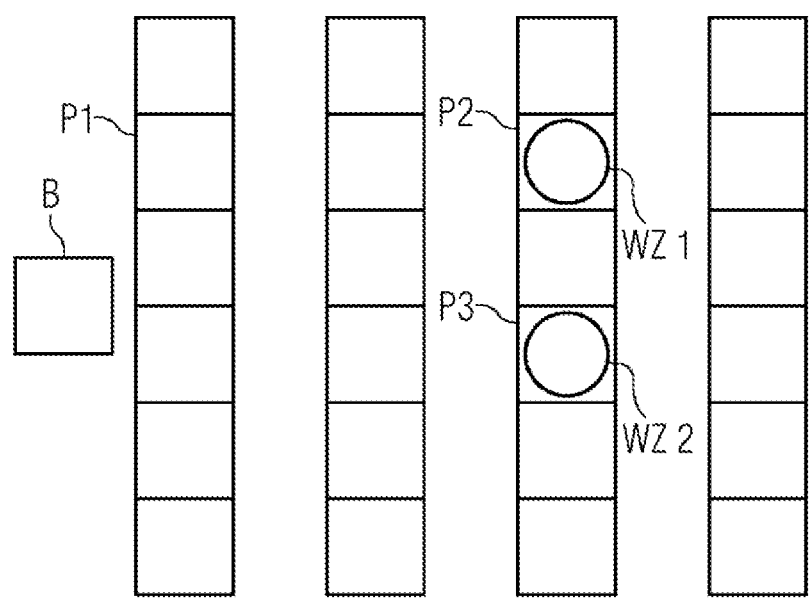
FIG. 3B shows a further step in the procedure for the definition of precedence shown in FIG. 3A.

In the first case, precedencies may be defined which require that specific tools are transported to their target magazine location before other tools. For example, in FIG. 3A the tool WZ2 is firstly moved to its target magazine location P3 before the tool WZ1 is moved from its magazine location P1 to its target magazine location P2 (see FIG. 3B). In step 1 of FIG. 2, preceding relationship or dependencies can be determined for the tool transporting operations, according to which precedencies result or are formed for the tool transporting operations. In addition, in FIG. 3A the provision location which is explained at the beginning is characterized by B.

During the determination of the precedencies, the second case which is described above can occur, and in embodiments, incidences of jamming or transportation cycles which must firstly be broken up can be made visible. The transportation cycles can be found in step 2 of FIG. 2 by means of a depth-first search in a polynomial running time.

Figure 4A:
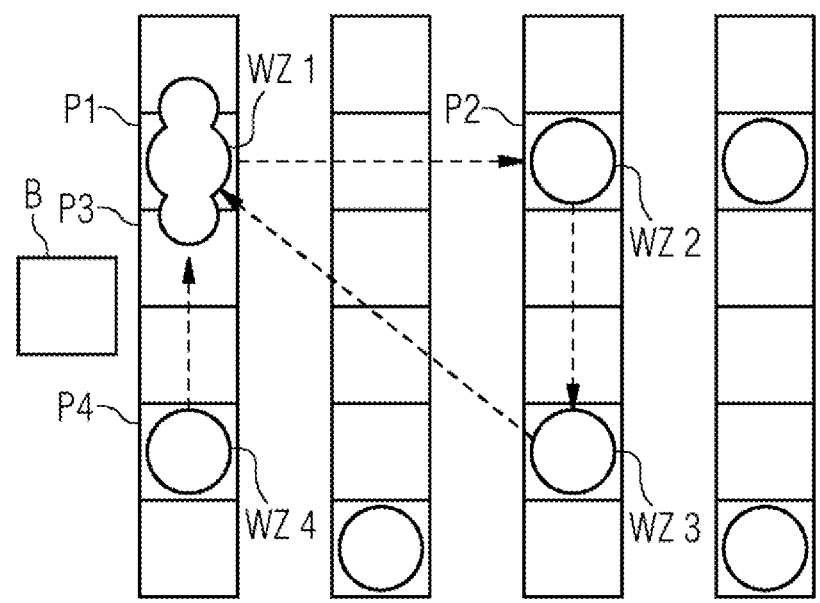
FIG. 4A shows a procedure for the removal of instances of jamming.
Figure 4B:
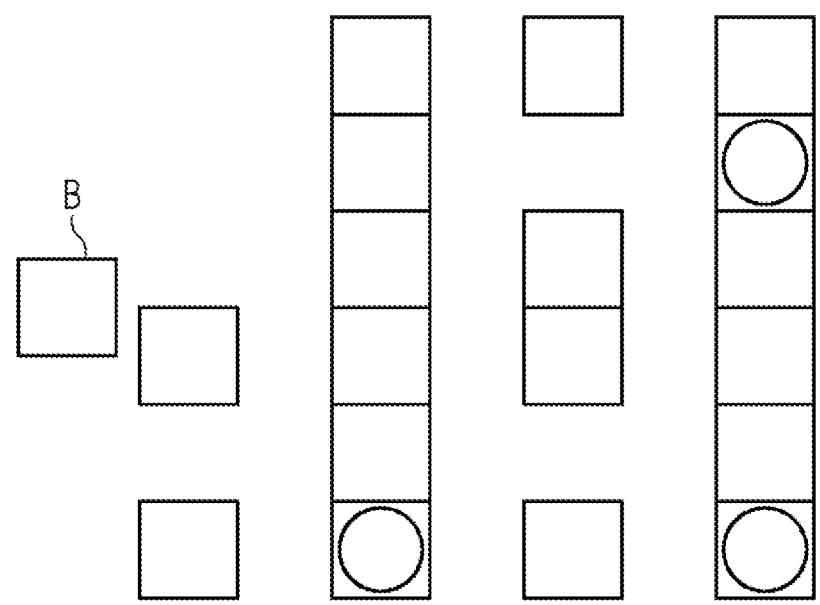
FIG. 4B shows a further step the procedure for the removal of instances of jamming shown in FIG. 4A.

Transportation cycles act, for example, in such a way that a tool, e.g. WZ1, requires the magazine location P2 of the tool WZ2, the tool WZ2 requires the magazine location of the tool WZ3, and in the present case according to FIG. 4A a further tool WZ3 requires the magazine location P1 of the tool WZ1, and therefore jamming in the form of a ring closure, also referred to as a deadlock occurs. Before the transportation cycles are broken up, this is initially removed. The result is shown in FIG. 4B. That is to say all the tools which belong to a transportation cycle, and additionally all the tools which have successive precedencies with respect to tools in transportation cycles (e.g. tool WZ4 in FIG. 4A) are, according to step 3 of FIG. 2, canceled or removed with the associated initial magazine and target magazine locations from their problematic situation and or initially not considered in the rest of the procedure. The dashed arrows in FIG. 4A signify the tool transfers to be carried out. For example, tool WZ1 of (magazine) location P1 is to be moved to (magazine) location P2. The tools WZ1, WZ2 and WZ3 form a transportation cycle. As the tool WZ1 is excessively large, it covers not only the location P1 but also (magazine) location P3, to which the tool WZ4 is to be transported. In this embodiment, this means that the tool WZ1 must be moved to its target magazine location before tool WZ4. Therefore, for WZ4 a successive precedence is induced with respect to a tool from the transportation cycle. The FIG. 4B shows the reduced magazine, wherein the remaining tools can become free of collisions with respect to another (target) magazine location.

The result according to the canceling process is then the quantity of the tool transfers to be carried out (see step 4 of FIG. 2) and which no longer induce transportation cycles. In this embodiment, the sequence of the tool transfer or tool transporting operations which are to be finally carried out is then to be defined and optimized in step 5 of FIG. 2. For this purpose, a mixed integral program (MIP) may be used, said program modeling the precedencies and determining the sequence of the tool transfer so that the sum of the transportation time periods is minimized. In order to calculate the sequence of tool transfers, the MIP formulation of an asymmetrical traveling salesman problem (ATSP) with precedence restrictions may be used. The solution of the MIP then provides a first part of the result, which is referred to by OUT in FIG. 2. The result is a transfer list. Since there are no longer any transportation cycles, the precedencies are taken into account in the model and both the initial assignment and also the target assignment are permissible, it is ensured that the solution of the MIP provides a sequence for the re-sorting, in which the permissibility of all the magazine occupancies which occur is complied with at any time. A detailed description of the procedure directly follows FIGS. 5A, 5B, 6, 7 and 8. Normally, the ATSP-MIP with precedencies can usually be broken up within a few seconds.

In the next step 6 of FIG. 2, the transportation cycles which have been removed in the meantime may be broken up since no further collision-free transfer of the tools is possible anymore. Therefore, tools from the transportation cycles may be temporarily parked at other magazine locations, and corresponding magazine locations may be cleared first. The breaking up of the transportation cycles is described in more detail below with respect to FIGS. 8A and 8B.

As a result, tool transfers which can be carried out without a collision or obtained again, for which transfers the sequence of the tool transfers can be determined again with the procedure described above. In this embodiment, the tool transfers which are determined in this way are added to the transfer list. That is to say the precedencies are firstly determined, then the transportation cycles which have to be removed, and finally the ATSP MIP may be used with precedencies in order to define the sequence of the tool transfers. This method is carried out until all the transportation cycles are broken up and the transportation sequence of the associated tool transfers has been calculated and/or specified, or no further transportation cycles have to be broken up any more. A subset of tool transporting operations is determined so that the tools can be brought in this transportation sequence from their occupied magazine location to their target magazine location without a collision with respect to the space required.

In this embodiment, the output is a transfer list which contains the sequence of the tool transfers and contains the initial magazine location and the target magazine location for each tool which has to be repositioned.

Finally, according to the transfer list, the actual tool transporting operations are carried out according to the optimized sequence.

In an embodiment, an expedient precondition for the determination of the sequence of the tool transfers and for the minimization of the re-sorting time period is that the precedencies are already determined and transportation cycles are broken up or removed. Furthermore, it can also be assumed that each tool is brought directly from its initial magazine location to its target magazine location. Therefore, free magazine locations, which are neither initial magazine locations nor target magazine locations of a tool are not used and therefore do not have to be considered (i.e. they can be canceled). In summary, in an embodiment, the following preconditions may apply:

All the magazine locations considered are either initial magazine locations or target magazine locations of a tool.

There are no transportation cycles.

Precendencies for the tool transfers are provided.

In an embodiment, before all precedencies are complied with and each tool is transported directly from its initial magazine location to its target magazine location it follows from this that the permissibility of the magazine occupancy is satisfied during the entire repositioning process. As a result of the securing of the initial magazine location and of the target magazine location for each tool, the transportation time period for moving a tool from its initial magazine location to its target magazine location is also defined. Therefore, it is only necessary to optimize the transfer times for empty movements of the magazine device, from a magazine location at which a tool has been deposited to the next magazine location at which a tool is picked up.

This problem can be modeled as an asymmetrical traveling salesman problem (ATSP) with precedencies. The ATSP can be defined as follows: it is assumed that a number of cities (nodes) $N=\{1, \ldots, n\}$ is given. For each pair of cities (nodes) i, j, $c_{ij}$ describes the costs of the journey between these cities. An aspect relates to determine a round trip (tour) which visits each city (node) precisely once and for which the overall costs are minimal. The ATSP can be modeled as a graph problem. The graph $G=(N, E)$ is defined by the number of nodes N and the number of edges E, wherein an edge (i, j) is contained in the number of edges E whenever a journey (connection) is possible between two cities (nodes). The costs $c_{ij}$ define the weights of the edges. A tour is looked for in G so that the sum of the weights of the edges of the edges being looked for is minimal. If a number of precedencies is additionally given as an input, for example in the form "node I before node j", an optimum tour is looked for which takes into account all the precedencies. That is to say the node i is positioned before the node j in the tour.

Figure 5A:
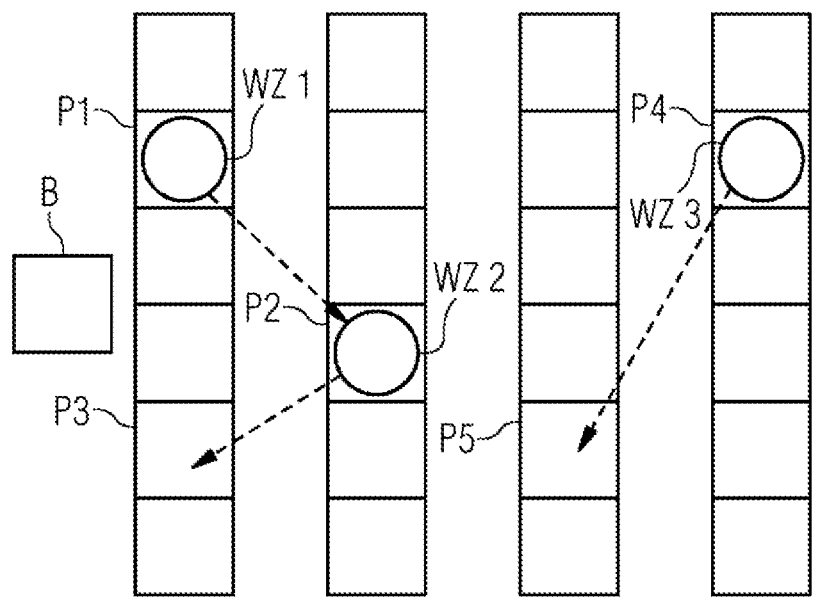
FIG. 5A shows a procedure for the construction of a graph G from the quantity of tuples from an initial magazine location and target magazine location.
Figure 5B:
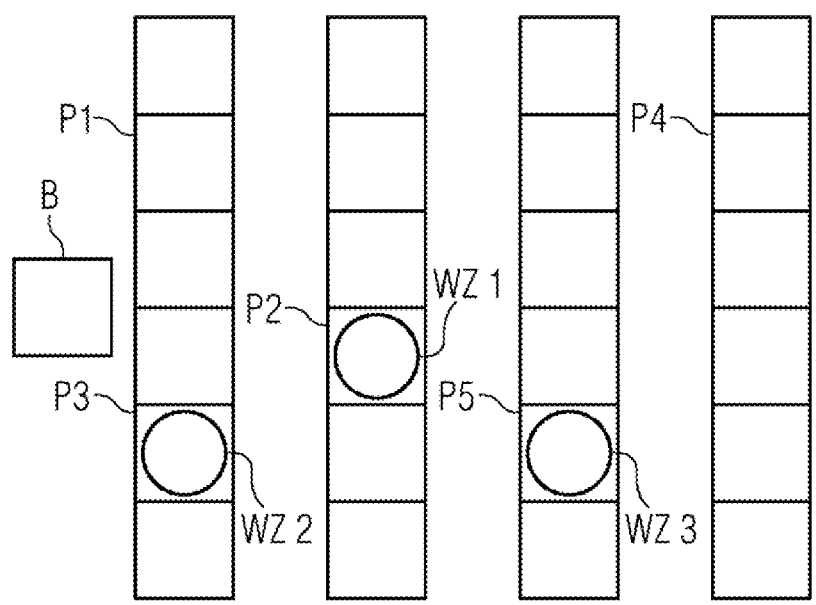
FIG. 5B shows a further step in the procedure for the construction of a graph G from the quantity of tuples from an initial magazine location and target magazine location shown in FIG. 5A.
Figure 6:
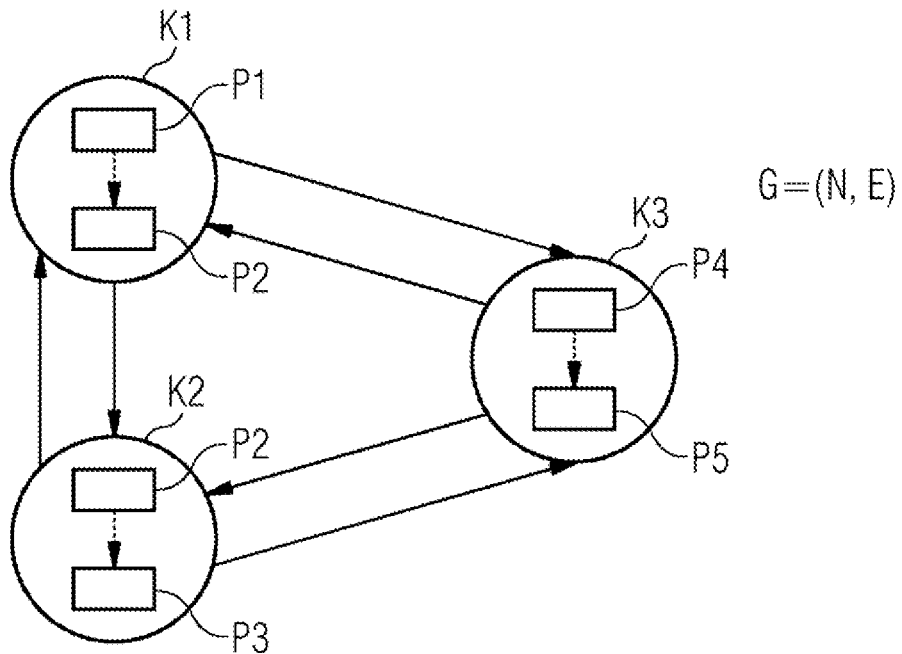
FIG. 6 shows the result of the constructed graph.
Figure 7:
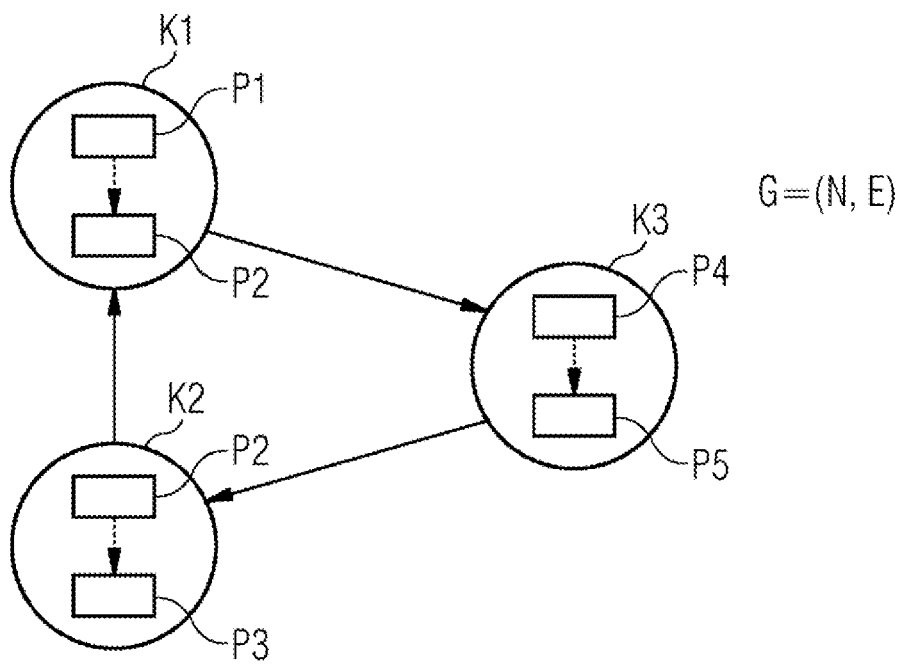
FIG. 7 shows a permissible tour on the graph.

For the re-sorting problem, it is possible to define a graph $G=(N, E)$ as follows. In an embodiment, each secured initial target magazine pair or tuple forms a node. Accordingly, the number of all the initial target magazine location pairs can be identified as the number of nodes N of the graph G. Edges between two nodes i and j from the number of nodes N stand for a possible empty movement. The edge weightings $c_{ij}$ correspond to the emptying movement time periods between the target magazine location of node i and the initial magazine location of node j. The following example according to FIGS. 5A, 5B and 6 shows the transformation of the problem of the re-sorting of tools into an ATSP entity. It is assumed that the three tools WZ1, WZ2 and WZ3 are given, along with the initial assignment (see FIG. 5A) and target assignment (see FIG. 5B): the graph $G=(N, E)$ is constructed as follows: each initial target magazine location pair defines a node. Each node therefore represents a secured tool transfer of a tool from its initial magazine location to its target magazine location. The number of nodes N of the graph is therefore composed of three nodes K1, K2, K3. The edges of the graph are the possible empty movements, and the edge weightings indicate the empty movement time periods. For example the edge weighting $C_{K2,K3}$ therefore corresponds to the time required for an empty movement from location P3 to location P4. Conversely, $C_{K3,K2}$ defines the time period for an empty movement from location P5 to location P2.

In the above example, only one precedence has to be considered, specifically that the tool WZ2 is firstly transported from location P2 to location 3 before the tool WZ1 is moved from location P1 to location 2. A possible solution for a tour on the graph G=(N, E) which considers this precedence is given in FIG. 7. The tool starts at node K3, i.e. the tool WZ3 is moved from location P4 to location P5, and after this an empty movement takes place from location P5 to location P2, and subsequent to this tool WZ2 is taken up and moved from location P2 to location P3, and in turn an empty movement takes place from location P3 to location P1. From there, the tool WZ1 is moved to its target location P2. The ATSP with precedencies can be modeled as a mixed integral program (MIP). For example, the ATSP with precedencies can be modeled with the MIP formulation from the article published in 2004: "New tighter polynomial length formulations for the asymmetric traveling salesman problem with and without precedence constraints" by Subhash C. Sarin, Hanif D. Sherali, Ajay Bhootra (https://doi.org/10.1016/j.orl.2004.03.007), wherein the cities which are given therein are replaced by the nodes which are already describe above.

With a simple precedence-considering nearest neighbor heuristic, described below, it is additionally possible to calculate a permissible starting solution for the MIP very quickly. This also ensures solutions which are always permitted for entities which are very difficult to solve.

In an embodiment, in the nearest neighbor heuristic, at the start a node for which there are no predecessor precedencies is visited in the graph G. Then, from among the nodes which are possible from the precedence point of view and have not yet been visited that node is selected for which the edge weighting for the node which was last visited is minimal. This may be repeated until all the nodes have been visited.

In an embodiment, the following heuristic can be applied to break up transportation cycles. Firstly, a method may berequired to be able to carry out an individual tool transfer which takes into account the space restrictions. The tool which is involved in the transportation cycle and which is to be shifted is referred to below as a transfer tool. The function of the tool transfer (transfer tool) checks whether for a given tool (transfer tool) there is a magazine location at which it can be shifted from its current magazine location. To do this, firstly further tools possibly have to be moved away in order to provide such a location. The function is as follows:

Tool Transfer (Transfer Tool)
1. Try a direct transfer for the transfer tool.
2. If no direct transfer is possible, try an indirect transfer.
3. Otherwise no transfer is carried out.

The direct transfer searches for a free and permissible location for the transfer tool, to which location said tool can be transported without a collision and without the need to shift further tools in the magazine. If this is possible, the transfer may be carried out immediately. Otherwise, an indirect transfer is attempted. In this context, a magazine location is sought which can be freely cleared by a direct transfer from one or more tools in the magazine for the transfer tool. In an embodiment, the direct transfers of the other tools are implemented first, and then the transfer tool is shifted. If neither a direct nor an indirect transfer is possible, no transfer is carried out for the tool. In FIG. 8A, the direct transfer is illustrated, and in FIG. 8B the indirect transfer is illustrated. For figure WZ2 it is possible to carry out a direct transfer to the location P4 or location P6 which can be reached without a collision. In this embodiment, for the excessively large tool WZ1, a direct transfer is not possible since this tool occupies three magazine locations in each case. However, an indirect transfer for tool WZ1 can be implemented to the location P2 which can be reached indirectly if the tool WZ2 and tool WZ3 have each been previously shifted by a direct transfer to location P4 or location P6. By using the tool transfer function (transfer tool) it is then possible to break up the transportation cycles. For the tools of a transportation cycle, the tool transfer function (transfer tool) is successively called. If a tool transfer is possible for a tool, it is carried out and therefore the transportation cycle which is under consideration is broken up. If a tool transfer is not possible for a tool of the transportation cycle, the transportation cycle cannot be broken up.

The tool transfers for breaking up the transportation cycles can then be included in the optimization of the tool transportation sequence. They are added to the transfer list mentioned above.

Although embodiments of the invention have been illustrated and described in detail by means of the preferred exemplary embodiment, embodiments of the invention are not limited by the disclosed examples, and other variations can be derived by a person skilled in the art without departing from the scope of protection of embodiments of the invention.

The implementation of the processes or method sequences described above can be carried out on the basis of instructions which are present in computer-readable storage media or in volatile computer memories (referred to collectively below as computer-readable memory). Computer-readable memories are, for example, volatile memories such as caches, buffers or RAMs as well as non-volatile memories such as removable storage devices, hard disks etc.

The functions or steps described above can be present here in the form of at least one instruction set in a computer-readable memory. The functions or steps are not bound here to a specific instruction set or to a specific form of instruction sets or to a specific storage medium or to a specific processor or to specific implementation schemes and can be executed by means of software, firmware, microcode, hardware, processors, integrated circuits etc., in an independent operation or in any desired combination. In this context, a wide variety of processing strategies can be used, for example serial processing by means of a single processor or multiprocessing or multitasking or parallel processing etc.

The instructions can be stored in local memories, but it is also possible to store the instructions in a remote system and to access them via a network.

The term "computer-aided" can be understood in the context of embodiments of the invention to mean, for example, an implementation of the method in which, in particular, a processor executes at least one method step of the method.

The terms "processor", "central signal processing", "control unit" or "data evaluation means" as used here comprise processing means in the widest sense, that is to say for example servers, universal processors, graphic processors, digital signal processors, application-specific integrated circuits (ASICs), programmable logic circuits such as FPGAs, discrete analog or digital circuits and any desired combinations thereof, including all the other processing means which are known to a person skilled in the art or will be developed in future. Processors can be composed here from one or more devices or apparatuses or units. If a processor is composed of a plurality of devices they can be configured for the parallel or sequential processing or execution of instructions. The term "memory unit" can be understood in the context of embodiments of the invention to mean, for example, a memory in the form of a main memory (random-access memory, RAM) or a hard disk.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for the computer-aided optimization for tool transporting operations for at least one tool magazine which has a number of magazine locations and which is used for a machine tool which is used to produce one or more workpieces using the tools provided by a magazine device at a provision location,
having the following steps:
 a) detecting, by a control device having at least one processor, a quantity of tools,
 b) detecting, by the control device, the space required for each tool,
 c) detecting, by the control device, a quantity of magazine locations which are occupiable for each tool,
 d) detecting, by the control device, a permissible initial magazine occupancy, wherein an initial magazine location is detected for each tool,
 e) detecting, by the control device, the permissible target magazine occupancy, wherein target magazine locations are detected for at least one subset of the detected quantity of tools for which a tool transporting operation is to be carried out,
 f) detecting, by the control device, a quantity of transportation time periods which are respectively required by a movement of the magazine device from one magazine location to another magazine location,
 g) determining, by the control device, a subset of tool transporting operations for which a transportation sequence is specifiable, so that in this transportation sequence the tools are moveable to their target magazine location without a collision in respect of the space required by their occupied magazine location,
 h) optimizing, by the control device, the transportation sequence for this subset of tool transporting operations in such a way that the sum of the transportation time periods required for these tool transporting operations is minimized, and
 i) performing, by the control device, the tool transporting operations on the basis of the optimized transportation sequence.

2. The method as claimed in the claim 1, wherein the steps g) and h) are, where appropriate, carried out repeatedly until all of the tools detected in step e) have reached their target magazine location.

3. The method as claimed in claim 1, wherein the quantity of transportation time periods comprises a quantity of empty movement time periods for each tool-less movement of the magazine device from one magazine location to another magazine location.

4. The method as claimed in claim 1, wherein the quantity of magazine locations which is occupied by a tool which occupies its target magazine location is reduced to the target magazine location.

5. The method as claimed in claim 1, wherein at least one tool from the detected quantity of tools is transported without a collision from its occupied magazine location to another magazine location which is occupied, in order to determine the subset of tool transporting operations and in order to optimize the transportation sequence for this subset of tool transporting operations.

6. The method as claimed in claim 1, wherein the steps g) and h) are, where appropriate, carried out repeatedly as long as at least one subset which contains a single element is determined in step g).

7. The method as claimed in claim 1, wherein the specified subset of tool transporting operations from step g) is determined by:
 a) forming precedencies for the tool transporting operations,
 b) determining tool transporting operations which are involved in jamming during the occupation of the magazine locations for the tool transporting operations,
 c) determining tool transporting operations which have a sequential dependence on the determined instances of jamming,
 d) determining the subset of tool transporting operations with the exclusion of the tool transporting operations determined in b) and c).

8. The method as claimed in claim 5, wherein at least one tool from the detected quantity of tools which is involved in jamming or in a sequential dependence is transported without a collision from the magazine location which is occupied by it to another magazine location which is occupied, in order to determine the subset of tool transporting operations and in order to optimize the transportation sequence for this subset of tool transporting operations.

9. The method as claimed in claim 1, wherein at least one tool from the detected quantity of tools is transported without a collision from the magazine location which is occupied by it to another magazine location which is occupiable, so that at least one tool which is involved in jamming or in a sequential dependence is transportable without a collision from its magazine location to this magazine location which is occupiable and which has become free, in order to determine the subset of tool transporting operations and in order to optimize the transportation sequence for this subset of tool transporting operations.

10. The method as claimed in claim 7, wherein the instances of jamming are determined by means of a width-first search or depth-first search in a polynomial running time.

11. The method as claimed in claim 7, wherein the sequential dependencies are determined with respect to the determined instances of jamming by means of a width-first search or depth-first search in a polynomial running time.

12. The method as claimed in claim 1, wherein the abovementioned optimization is carried out by means of a nearest neighbor heuristic.

13. The method as claimed in claim 1, wherein the abovementioned optimization is carried out by means of mixed integral linear optimization.

14. The method as claimed in claim 13, wherein a model for the mixed integral linear optimization is formulated as what is referred to as an asymmetrical traveling salesman problem taking into account the precedencies.

15. The method as claimed in claim 12, wherein for a starting configuration of the model it is possible to use a calculation from a nearest neighbor heuristic.

16. The method as claimed in claim 14, wherein the nodes of the graph on which the abovementioned asymmetrical traveling salesman problem is based are each represented by a tuple composed of an initial magazine location and target magazine location from the detected subset of machine transporting operations whose initial magazine location and target magazine location are different.

17. The method as claimed in claim 14, wherein the edges of the graph on which the abovementioned asymmetrical traveling salesman problem is based are each supplemented by a weighting which respectively results from an empty movement time period from a target magazine location of the preceding node to an initial magazine location of the following node.

18. A control device for the computer-aided optimization of tool transporting operations of a tool transporting sequence for at least one tool magazine which has a number of magazine locations and which is usable for a machine tool which is used to produce one or more workpieces using the tools provided by a magazine device at a provision location, having:
- a) a detection unit for detecting a quantity of tools,
- b) the same or another detection unit for detecting the space required for each tool,
- c) the same or another detection unit for detecting a quantity of machine locations which is occupiable for each tool,
- d) the same or other detection unit for detecting a permissible initial magazine occupancy, wherein an initial magazine location is detected for each tool,
- e) the same or another detection unit for detecting the permissible target magazine occupancy, wherein target magazine locations are detected for at least one subset of the detected quantity of tools for which a tool transporting operation is to be carried out,
- f) the same or another detection unit for detecting a quantity of transportation time periods which respectively requires a movement of the magazine device from one magazine location to another magazine location,
- g) a determining unit for determining a subset of machine transporting operations for which a transportation sequence is specifiable so that the tools in this transportation sequence are moveable without a collision with respect to the space requirement from their occupied magazine location to their target magazine location,
- h) an optimization unit for optimizing the transportation sequence for this subset of tool transporting operations in such a way that the sum of the transportation time periods which are required for these tool transporting operations is at a minimum or is minimized, and
- i) a control unit for performing the tool transporting operations on the basis of the optimized transportation sequence.

19. A computer program product, comprising a computer readable hardware storage device having computer readable program code stored therein, said program code executable by a processor of a computer system to implement a method with program code means for carrying out the method as claimed in claim 1.

20. The computer program product of claim 19, wherein the computer program product is run on a control device for the computer-aided optimization of tool transporting operations of a tool transporting sequence for at least one tool magazine which has a number of magazine locations and which is usable for a machine tool which is used to produce one or more workpieces using the tools provided by a magazine device at a provision location, having:
- a) a detection unit for detecting a quantity of tools,
- b) the same or another detection unit for detecting the space required for each tool,
- c) the same or another detection unit for detecting a quantity of machine locations which is occupiable for each tool,
- d) the same or other detection unit for detecting a permissible initial magazine occupancy, wherein an initial magazine location is detected for each tool,
- e) the same or another detection unit for detecting the permissible target magazine occupancy, wherein target magazine locations are detected for at least one subset of the detected quantity of tools for which a tool transporting operation is to be carried out,
- f) the same or another detection unit for detecting a quantity of transportation time periods which respectively requires a movement of the magazine device from one magazine location to another magazine location,
- g) a determining unit for determining a subset of machine transporting operations for which a transportation sequence is specifiable so that the tools in this transportation sequence are moveable without a collision with respect to the space requirement from their occupied magazine location to their target magazine location,
- h) an optimization unit for optimizing the transportation sequence for this subset of tool transporting operations in such a way that the sum of the transportation time periods which are required for these tool transporting operations is at a minimum or is minimized, and
- i) a control unit for performing the tool transporting operations based on the optimized transportation sequence.

* * * * *